United States Patent [19]

Rudisill

[11] Patent Number: 5,711,588
[45] Date of Patent: Jan. 27, 1998

[54] BACKLIT KEYPAD ASSEMBLY

[75] Inventor: Charles A. Rudisill, Apex, N.C.

[73] Assignee: Ericsson, Inc., Research Triangle Park, N.C.

[21] Appl. No.: 723,765

[22] Filed: Sep. 30, 1996

[51] Int. Cl.⁶ ........................................... H04M 1/22
[52] U.S. Cl. .................. 362/30; 362/24; 362/27; 200/313; 200/314
[58] Field of Search ..................... 362/23, 24, 26, 362/27, 28, 29, 30, 109, 31, 800, 85; 200/313, 314, DIG. 47

[56] References Cited

U.S. PATENT DOCUMENTS

| | | | |
|---|---|---|---|
| 4,670,633 | 6/1987 | Kaiwa et al. | 362/24 |
| 5,053,928 | 10/1991 | Pasco | 362/24 |
| 5,083,240 | 1/1992 | Pasco | 362/24 |
| 5,097,396 | 3/1992 | Myers | 362/32 |
| 5,130,897 | 7/1992 | Kuzma | 362/24 |
| 5,149,923 | 9/1992 | Demeo | 200/5 |
| 5,384,459 | 1/1995 | Patino et al. | 250/229 |
| 5,397,867 | 3/1995 | Demeo | 200/5 |
| 5,510,782 | 4/1996 | Norris et al. | 341/22 |

*Primary Examiner*—Thomas M. Sember
*Attorney, Agent, or Firm*—Jenkens & Gilchrist, P.C.

[57] ABSTRACT

Light-reflecting structures are provided on the lower surface of a cover mounted over the keys of a keypad assembly. The light-reflecting structures reflect light from a vertical-emitting source, such as an LED, to the side surfaces of the individual keys of the keypad assembly. The keypad assembly embodying the present invention provides an efficient and low-cost structure for illuminating the keys of a keypad without the use of lightguides or separate sources of light for each key, thereby also providing a desirable low profile keypad assembly.

8 Claims, 3 Drawing Sheets

BACKLIT KEYPAD ASSEMBLY

BACKGROUND OF THE INVENTION

1. Technical Field

This invention relates generally to illuminated keyboard switches and displays, and more particularly to such switches and displays that are illuminated from a back side by light-emitting diodes (LEDs).

2. History of Related Art

It is often desirable to provide backlighting of keypads on cellular phones, cordless phones, calculators, and other devices under low light or dark conditions. Common methods of providing backlighting to the keys of a keypad assembly include positioning a light source under each key or providing separate lightguides positioned beneath the keypad. In the latter arrangement, light-emitting diodes may be near the interstices of the keys and light emitted by the LEDs directed through a lightguide to the bottom surface of the key. The radiation pattern of typical surface-mounted "vertical" LEDs is primarily focused in a cone-like area encompassing about a 120° solid angle above the LED. This arrangement has the disadvantage of being inefficient due to the orientation of the LED. Typically, a lightguide is oriented perpendicular to the vertical cone of light and absorbs only a small amount of the emitted light. Thus, only a small portion of the available light from the LED actually illuminates the keypad. Additionally, since the most intense radiation is present primarily in the vertical direction, the illumination provided by a typical LED makes the LED inefficient for the backlighting of keys where the LED is not positioned directly below the key. Consequently, most of the light is randomly scattered against the keypad web and front housing, with a small amount reaching the viewer.

Other keypad backlighting arrangements use lightguides with specific diffusing features, such as painted dots, texture bars, and the like, in areas where the light needs to be scattered for even distribution. These designs generally require some type of side-emitting LEDs or other method to efficiently capture the light from the LED, as well as careful optical design. Lightguides typically increase the thickness of the keypad assembly, resulting in increased overall thickness of the instrument on which it is mounted.

Typically, when LEDs are positioned directly below a translucent key, it is desirable to provide an optical filter to diffuse the intense central region of the emitted light. An example of such a filter is disclosed in U.S. Pat. No. 5,397,867 issued Mar. 14, 1995, to Gregory B. Demen. This arrangement requires a separate LED and optical filter for each key, resulting in increased power supply requirements and consequent power consumption, number of parts, and higher cost.

Another attempt to provide uniform backlighting of a keypad panel includes the use of optical fibers to direct light from a single source to a plurality of different locations on the keypad. Such an arrangement is described in U.S. Pat. No. 5,097,396 issued Mar. 17, 1992, to Jerry Michael Myers. However, this arrangement also has the disadvantage of complexity, high cost, and large number of individual components.

The present invention is directed to overcoming the problems set forth above. It is desirable to have a backlighted keypad assembly that does not require the use of a lightguide beneath the keypad, thereby enabling the overall thickness of the keypad assembly to be reduced. It is also desirable to have such a keypad that does not require the use of specific diffusers to provide uniform illumination of the keypad. Furthermore, it is desirable to have such a keypad that is economical to produce and does not require a separate light source for each key of the assembly.

SUMMARY OF THE INVENTION

In accordance with one aspect of the present invention, a keypad assembly includes a substrate and a plurality of keys formed of a translucent material that are arranged in a planar array over the substrate. Each of the keys have a plurality of side surfaces disposed substantially perpendicular to the substrate. The keypad assembly also includes a cover disposed over predefined portions of each of the keys and has an upper surface, a lower surface, and a plurality of apertures defined by transverse walls extending from the upper surface to the lower surface. The cover has at least one multifaceted embossment extending downwardly from the lower surface at a position adjacent at least two of the apertures. The embossment has at least two reflective surfaces disposed at an angle sufficient to reflect light from a source perpendicular to the substrate to preselected side surfaces of at least two adjacently-positioned keys. Furthermore, the keypad assembly includes at least one source of light mounted on the substrate that is adapted to emit light in a direction substantially perpendicular to the substrate. The source of light is positioned immediately below a corresponding multifaceted embossment extending outwardly from the lower surface of the cover.

Other features of the keypad assembly embodying the present invention include portions of the cover forming intervening webs that extend between adjacently-disposed apertures. At least one multifaceted embossment extends downwardly from the lower surface of the cover at an intersection of two of the intervening webs. In this arrangement, the multifaceted embossment has four reflective surfaces, each of which is disposed at an angle sufficient to reflect light from a source perpendicular to the substrate to preselected site surfaces of four adjacently-positioned keys.

Other features of the keypad assembly embodying the present invention include the reflective surfaces of the multifaceted embossment being separately defined off-axis paraboloidal reflectors. Still other features include the multifaceted embossment extending downwardly from the bottom surface of the cover being alternatively integrally formed with the cover or formed as a separate attachment to the cover. Yet another feature includes the source of light comprising a light-emitting diode mounted on the substrate.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF A PRESENTLY PREFERRED EXEMPLARY EMBODIMENT

The term "keypad assembly" as used herein means a structure having a plurality of separately operable keys that, either directly or indirectly, actuate a corresponding switch to close an electrical circuit indicative of a value assigned to the key. Such keypads are used on cellular telephones, cordless, calculator, notebook computers, and similar devices.

Figure 1:
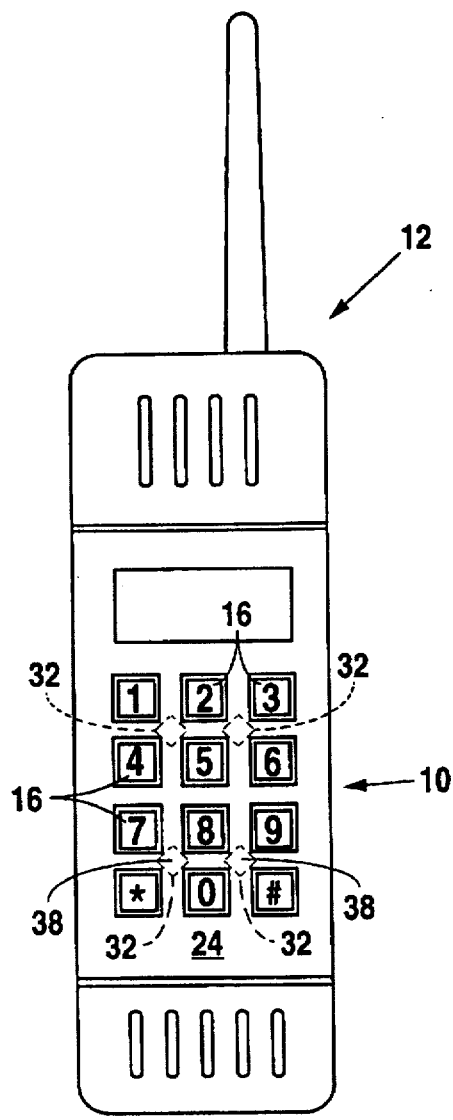
FIG. 1 is a plan view of a cellular telephone having a keypad assembly embodying the present invention.
Figure 4:
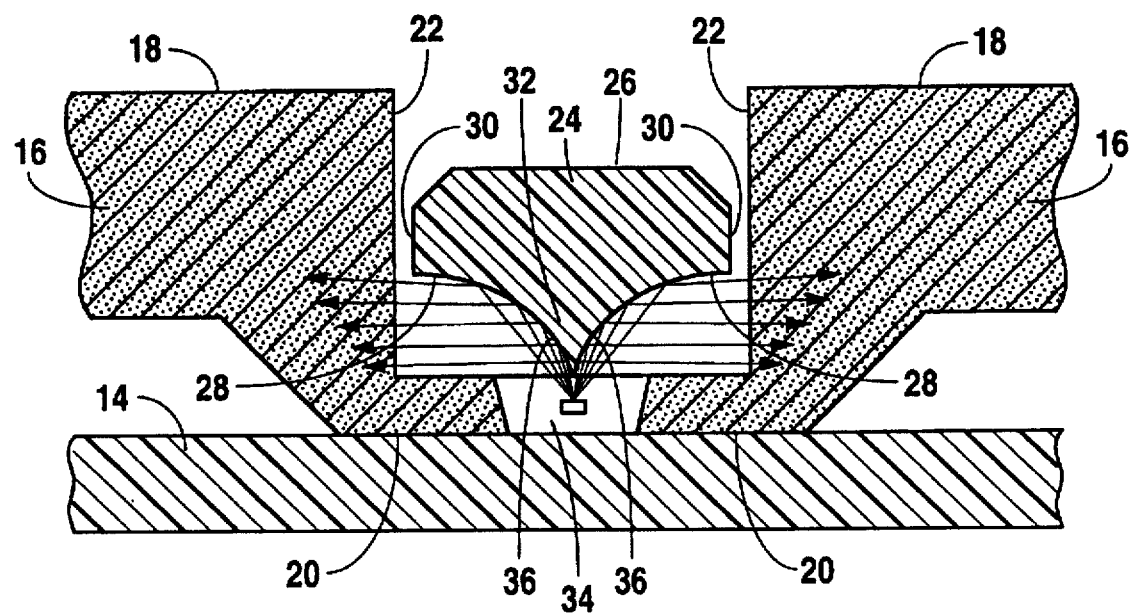
FIG. 4 is a sectional view of a portion of the keypad assembly embodying the present invention, showing a light-emitting diode mounted on the upper surface of a substrate.
Figure 5:
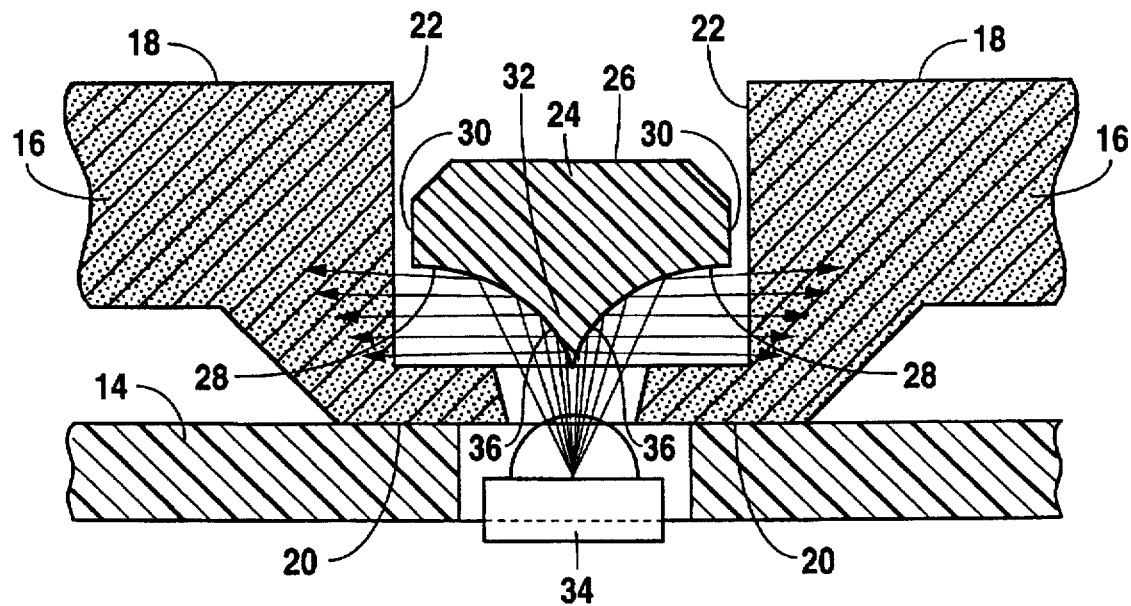
FIG. 5 is a partial sectional view of a keypad assembly embodying the present invention, showing a light-emitting diode mounted on the bottom surface of a substrate member.

In the present invention, a keypad assembly 10 embodying the present invention is shown in conjunction with a cellular telephone 12 as illustrated in FIG. 1. The keypad assembly 10 includes a substrate 14, as shown in FIGS. 4 and 5, such as a printed circuit board (PCB) or laminated flexible film. The substrate 14 typically contains conductive traces within or on a laminated structure providing circuits between switches and other electrical components.

The keypad assembly 10 embodying the present invention further comprises a plurality of spaced-apart keys 16 formed of a light-transmitting or translucent material such as silicone rubber. In the illustrate embodiment, an opaque character is imprinted or formed on a top surface 18 of each of the keys 16 so that light passing through the key 16 is blocked by the opaque character. Another type of translucent key passes light only through character-forming openings in an otherwise opaque top surface of the keys 16. Each of the keys 16 also has a lower surface 20 and a plurality of side surfaces 22 disposed substantially perpendicular to the substrate 14. The keys 16 are arranged in a planar array over the substrate 14 in a generally parallel relationship with the substrate 14.

Figure 3:
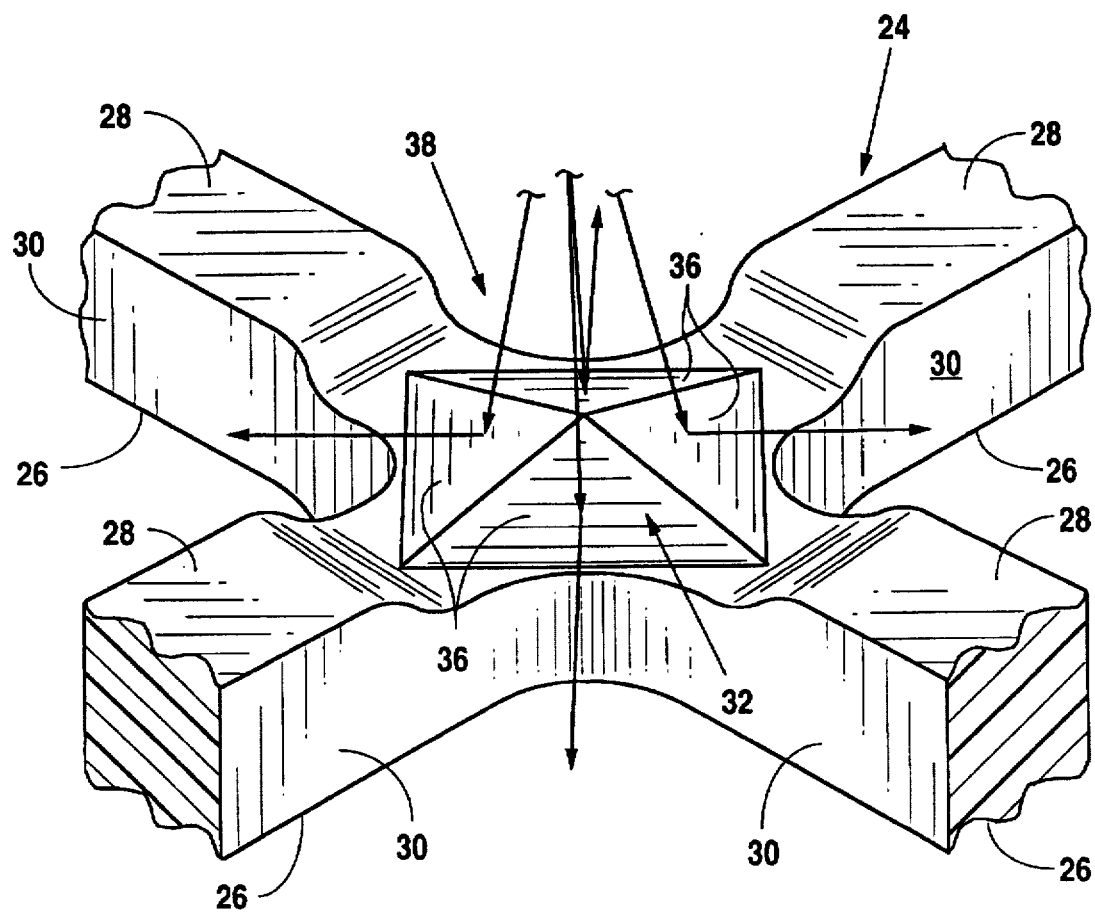
FIG. 3 is a three-dimensional view of the bottom, or lower, surface of a portion of the cover of the keypad assembly embodying the present invention.

The keypad assembly 10 embodying the present invention also includes a cover 24 that is disposed over predefined portions of each of the keys 16, forming a shell or front housing over the keys 16. The cover 24 has an upper surface 26, a lower surface 28, and a plurality of apertures defined by transverse walls 30 that extend between the upper surface 26 and the lower surface 28 of the cover 24. In the illustrated embodiment, each of the apertures is defined by four transverse walls 30 which surround a respective one of the keys 16 with the transverse walls 30 being disposed adjacent a respective side surface 22 of the surrounded key 16. Importantly, the cover 24 includes at least one, and preferably a plurality of, multifaceted embossments or protuberances 32 extending downwardly from the lower surface 28 of the cover 24 at pre-determined locations adjacent at least two of the apertures formed in the cover 24. As shown in FIGS. 3–5, each of the multifaceted embossments 32 have at least two, and preferably four, reflective surfaces 36 disposed at an angle sufficient to reflect light from a source 34 such as a light-emitting diode mounted on the substrate 14, to preselected side surfaces 22 of at least two adjacently-positioned keys 16.

Figure 2:
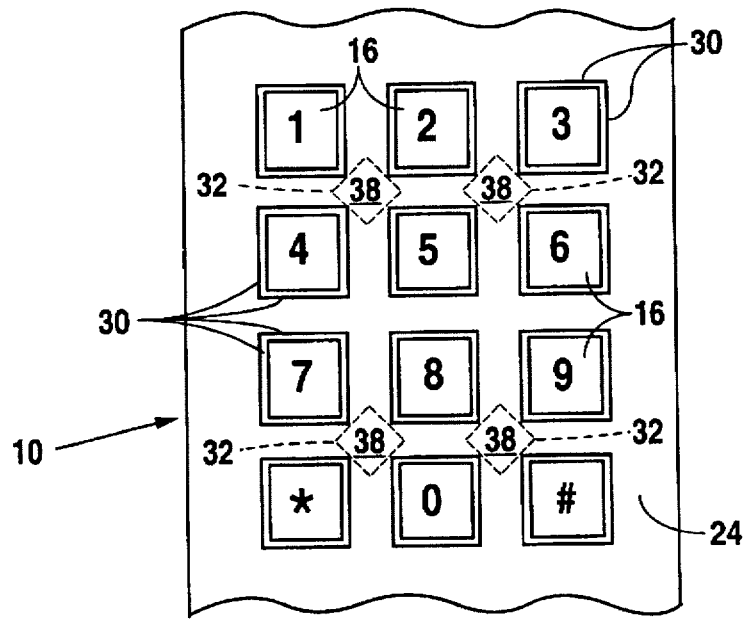
FIG. 2 is a partial plan view of the keypad assembly embodying the present invention.

The reflective surfaces 36 are positioned directly above and close to the source of light 34 mounted on the substrate 14. The angular position and orientation of the reflective surfaces 36 is such that the upwardly directed cone of light radiated from the source 34 is directed toward the edge, or side surfaces 22, of the keys 16, thus efficiently using the available light energy. The contour of the reflecting surfaces 36 may be planar, hemispherical, compound curved, or surfaces of revolution of curves such as off-axis parabolic surfaces forming paraboloidal reflectors, as illustrated in FIGS. 4 and 5. The off-axis parabolic reflective surface is particularly desirable because the light rays reflected from the surface 36 are disbursed over a predefined divergent angle, i.e., the reflected rays are not precisely parallel. As can be seen in FIGS. 1 and 2, portions of the cover 24 form intervening webs that extend between adjacently-disposed apertures. The intervening webs between the rows and columns of keys intersect at the interstices between the keys, and provide a preferred position for location of the multifaceted embossments 32 on the lower surface 28 of the cover 24. When positioned at the intersection 38 of two of the intervening webs, the multifaceted embossments 32 preferably have four reflective surfaces 36, each of which is disposed at an angle sufficient to reflect light from the source of light 34 mounted on the substrate 14 to the proximally positioned side surfaces 22 of the four adjacently positioned keys 16. As shown in FIGS. 1 and 2, for a conventional 12-key keypad, only four reflective structures 32 are required on the lower surface 28 of the cover 24 and, consequently, only four corresponding sources of light 34 are needed to provide full illumination of all of the keys 16 in the assembly 10.

The reflective structures 32 are preferably molded directly into the lower surface 28 of the cover, or front housing, 24. The reflective surfaces 36 typically have a smooth surface finish, and preferably are coated with a material to reflect light in the wavelength provided by the source of light 34. Generally, aluminum provides a desirable reflective coating and is particularly desirable if RF shielding of the front cover 24 is required, in that the multifaceted embossments 32 are also coated during the application of the RF shielding. A local reduction in thickness of the web portions of the cover 24 adjacent the intersection of the webs, as shown in FIG. 3, may be desirable to provide clearance for the reflected rays directed toward the side surfaces 22 of the keys 16. Alternatively, the reflective structure 32 comprising multifaceted reflective surfaces 36 may be formed as separate structures or as a sheet, for example by molding or vacuum-forming, and attached by an adhesive or other bonding method to the lower surface 28 of the cover 24.

In the keypad assembly 10 embodying the present invention, the source of light 34 is mounted on the substrate at a position immediately below each of the multifaceted reflective embossments 32. Desirably, the source of light 34 is conveniently provided by a light-emitting diode that is either mounted on the upper surface of the substrate 14, as illustrated in FIG. 4, or on the bottom or lower surface of the substrate 14, as illustrated in FIG. 5. In the latter arrangement, an aperture is provided through the substrate 14 to permit the passage of light from the LED to the reflective surfaces 36 of the multifaceted embossment 32. In the illustrated embodiments, the LED 34 is a conventional vertically-mounted diode that emits light upwardly in a conical radiation pattern toward the reflective surfaces 36 whereat the light emitted from the diode 34 is reflected in a generally orthogonal direction toward the side surfaces 22 of the keys 16. It should be noted that even without a reflective coating on the surfaces 36 of the multifaceted embossments 32, when provided with a smooth surface finish, some light will be reflected toward the side surfaces 22 of the keys 16, depending upon the angle of the reflecting surface 36 to the light emitted from the LED 34. Lower angles of incidence will increase the amount of reflection. Any amount of light reflected toward the keys 16 is an advantage over existing designs which have no means for reflecting the vertical radiation pattern of the LED 34 into the side surfaces 22 of a key 16.

Sealing of the keypad assembly 10 may be conveniently provided, if desired, by a thin rib extending around the perimeter of the light-emitting diode 34, or above the light-emitting diode around the keys 16. Also, if desired, a translucent membrane may be bonded to the opening above the light-emitting diode 34.

Thus, it can be seen that the keypad assembly 10 embodying the present invention has a means for backlighting the keys 16 of the assembly 10 in a uniform manner wherein the intensity of illumination is evenly distributed to the side surfaces of the translucent keys. Further, the keypad assembly 10 embodying the present invention requires only a minimum number of light sources, resulting in lower costs, fewer components, and reduced power consumption.

Furthermore, since virtually all of the light emitted from the diodes 34 is directed to the keys 16, there is less loss of light and, accordingly, more brilliance, or intensity, of light provided to the keys 16. The present invention incorporates integral light-reflecting structures 32 into the front cover 24, which reflect the vertical cone of illumination from a light source 34 mounted near the interstices of the keys 16, into the side of each of the keys. The reflecting structures 32 efficiently use the radiant flux from the light source 34, thereby increasing illumination intensity.

Although the present invention is described in terms of a preferred exemplary embodiment, with specific illustrative arrangements of the light-reflecting structures and contours of the reflective surfaces, those skilled in the art will recognize that changes in those specific arrangements and constructions may be made without departing from the spirit of the invention. For example, it is recognized that the keys 16 could have a round shape with cylindrical side surfaces 22. In such a configuration, the plurality of side surfaces 22 of the keys 16 and transverse walls 30 of the apertures should be regarded as an infinite number of segments joined to form a substantially smooth curved surface. Such changes are intended to fall within the scope of the following claims.

Other aspects, features, and advantages of the present invention may be obtained from a study of this disclosure and the drawings, along with the appended claims.

What is claimed is:

1. A keypad assembly, comprising:

a substrate;

a plurality of keys formed of a translucent material and arranged in a planar array over said substrate in parallel relationship therewith, each of said keys having a plurality of side surfaces disposed substantially perpendicular to said substrate;

a cover disposed over predefined portions of each of said plurality of keys and having an upper surface, a lower surface, and a plurality of apertures defined by transverse walls extending from said upper surface to said lower surface, each of said apertures being disposed in surrounding relationship about a respective one of said keys with the transverse walls of each of said surrounding apertures being disposed adjacent a respective side surface of said surrounded key, and at least one embossment extending downwardly from said lower surface of the cover at a position adjacent at least two of said apertures and having at least reflective surface disposed at an angle sufficient to reflect light from a source perpendicular to said substrate to preselected side surfaces of said at least two adjacently positioned keys, said at least one curved reflective surface and at least a portion of the lower surface of the cover having a coating of a light-reflecting, radio-frequency shielding material disposed thereon;

at least one source of light mounted on said substrate and adapted to emit light in a direction substantially perpendicular to said substrate, said source of light being positioned immediately below a corresponding at least one multifaced embossment extending outwardly from the lower surface of said cover.

2. A keypad assembly, as set forth in claim 1, wherein portions of said cover form intervening webs extending between adjacently disposed apertures and said at least one multifaceted embossment extending downwardly from said lower surface of the cover at an intersection of two of said intervening webs, and said multifaced embossment has four reflective surfaces each of which is disposed at an angle sufficient to reflect light from a source perpendicular to said substrate to preselected side surfaces of four adjacently positioned keys.

3. A keypad assembly, as set forth in claim 1, wherein said reflective surfaces of said at least one multifaceted embossment are separately defined off-axis paraboloidal reflectors.

4. A keypad assembly, as set forth in claim 1, wherein said at least one multifaceted embossment extending downwardly from the bottom surface of said cover is integrally formed with said cover.

5. A keypad assembly, as set forth in claim 1, wherein said at least one multifaceted embossment extending downwardly from the bottom surface of said cover is an attachment to said cover.

6. A keypad assembly, as set forth in claim 1, wherein said at least one source of light comprises a light-emitting diode mounted on said substrate.

7. A keypad assembly, as set forth in claim 1, wherein said coating of a light-reflecting, radio-frequency shielding material disposed on at least one curved reflective surface and at least a portion of the lower surface of said cover comprises an aluminum coating.

8. A keypad assembly, as set forth in claim 1, wherein said cover includes a plurality of intervening webs extending between adjacently disposed apertures defined by transverse walls of the cover and has a first defined thickness between the upper and lower surfaces of the and said cover at the position on said lower surface from which at least one of said embossments extend has a second thickness between the upper and lower surfaces that is less than said first thickness.

* * * * *

UNITED STATES PATENT AND TRADEMARK OFFICE
CERTIFICATE OF CORRECTION

PATENT NO. : 5,711,588
DATED : Jan. 27, 1998
INVENTOR(S) : Rudisill

It is certified that error appears in the above-identified patent and that said Letters Patent is hereby corrected as shown below:

Column 2, line 10    Replace "army"
                     With --array--

Column 3, line 12    Replace "cordless,"
                     With --cordless telephones,--

Column 3, line 12    Replace "calculator,"
                     With --calculators,--

Column 5, line 34    Replace "wails"
                     With --walls--

Column 5, line 37    Replace "fail"
                     With --fall--

Column 6, line 4     After "least"
                     Insert --one curved--

Signed and Sealed this

Twenty-third Day of March, 1999

Attest:

*Attesting Officer*

Q. TODD DICKINSON

*Acting Commissioner of Patents and Trademarks*